United States Patent
Suzuki et al.

(10) Patent No.: US 11,186,058 B2
(45) Date of Patent: Nov. 30, 2021

(54) ANALYSIS DEVICE AND ANALYSIS METHOD FOR PREPARATORY WORK TIME IN PAPER CONVERTING MACHINE

(71) Applicant: MITSUBISHI HEAVY INDUSTRIES MACHINERY SYSTEMS, LTD., Hyogo (JP)

(72) Inventors: Yasunari Suzuki, Hiroshima (JP); Masayoshi Tanchi, Hiroshima (JP); Makoto Shimohatsubo, Hiroshima (JP); Osamu Yamamoto, Hiroshima (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 386 days.

(21) Appl. No.: 16/321,689

(22) PCT Filed: Sep. 27, 2017

(86) PCT No.: PCT/JP2017/035063
§ 371 (c)(1),
(2) Date: Jan. 29, 2019

(87) PCT Pub. No.: WO2019/064398
PCT Pub. Date: Apr. 4, 2019

(65) Prior Publication Data
US 2021/0178719 A1 Jun. 17, 2021

(51) Int. Cl.
*B31B 50/00* (2017.01)
*B31F 1/26* (2006.01)
(Continued)

(52) U.S. Cl.
CPC .............. *B31B 50/006* (2017.08); *B31F 1/26* (2013.01); *G06Q 10/063* (2013.01);
(Continued)

(58) Field of Classification Search
CPC ................ B31B 50/006; B31B 50/005; B31B 2100/0022; B31B 2120/302; B31F 1/26;
(Continued)

(56) References Cited

U.S. PATENT DOCUMENTS 5,182,705 A * 1/1993 Barr ................. G06Q 10/06311
705/7.16
6,268,853 B1 * 7/2001 Hoskins ................. G05B 15/02
700/83
(Continued)

FOREIGN PATENT DOCUMENTS

JP 2004326297 A 11/2004
JP 2011103049 A 5/2011
(Continued)

OTHER PUBLICATIONS

Office Action for Korean Application No. 10-2019-7002842 dated Jul. 27, 2020; 20pp.
(Continued)

*Primary Examiner* — Thomas M Wittenschlaeger
(74) *Attorney, Agent, or Firm* — Hauptman Ham, LLP

(57) ABSTRACT

An analysis device and an analysis method for a preparatory work time in a paper converting machine, includes an operator position detection device configured to detect a working position of an operator in the preparatory work time of a box making machine, an action diagram creation unit configured to create an action diagram of the operator based on the detection result of the operator position detection device, a work content item table creation unit configured to create a work content item table indicating a work content in the preparatory work time for each item based on operation processing data and operation data of the box making machine, and an operation process improvement item selection unit configured to select an improvement item of an operation process in the preparatory work time based on a (Continued)

creation result of the action diagram creation unit and the work content item table creation unit.

20 Claims, 8 Drawing Sheets

(51) Int. Cl.
  *G06Q 10/06* (2012.01)
  *G06Q 50/04* (2012.01)
  *B31B 100/00* (2017.01)
  *B31B 120/30* (2017.01)
(52) U.S. Cl.
  CPC ......... *G06Q 10/0633* (2013.01); *G06Q 50/04* (2013.01); *B31B 2100/0022* (2017.08); *B31B 2120/302* (2017.08)
(58) Field of Classification Search
  CPC .... B31D 2205/0082; B31D 2205/0088; B65B 57/00; B65B 59/00; B65B 59/001; B65B 59/003; B65B 59/04; G05B 19/418; G05B 19/4183; G06Q 10/0633; G06Q 10/063; G06Q 50/04
  See application file for complete search history.

(56) References Cited

U.S. PATENT DOCUMENTS

| | | | | |
|---|---|---|---|---|
| 8,548,838 | B1* | 10/2013 | Ganesan | G06Q 10/06311 705/7.13 |
| 8,876,681 | B2* | 11/2014 | Taketsugu | B65G 57/03 493/142 |
| 9,033,599 | B2* | 5/2015 | Kodama | B41F 13/025 400/76 |
| 9,132,599 | B2* | 9/2015 | Bober | B41F 13/025 |
| 10,239,275 | B2* | 3/2019 | Kaji | B41F 19/008 |
| 10,518,452 | B2* | 12/2019 | Uchiyama | B29C 45/76 |
| 10,591,907 | B2* | 3/2020 | Kobayashi | H05K 13/00 |
| 10,625,956 | B2* | 4/2020 | Sullivan | B66F 9/02 |
| 10,647,044 | B2* | 5/2020 | Iwakura | B29C 45/76 |
| 10,772,251 | B2* | 9/2020 | Hayashi | H05K 13/086 |
| 10,822,188 | B2* | 11/2020 | Kodama | B31B 50/98 |
| 2005/0209902 | A1* | 9/2005 | Iwasaki | G06Q 10/063114 705/7.26 |
| 2006/0200264 | A1* | 9/2006 | Kodama | H05K 13/08 700/121 |
| 2011/0219924 | A1* | 9/2011 | Cummings | B26D 5/00 83/39 |
| 2013/0184134 | A1* | 7/2013 | Suzuki | B41F 19/008 493/53 |
| 2013/0260975 | A1* | 10/2013 | Ota | B31F 7/00 493/31 |
| 2013/0336532 | A1* | 12/2013 | Tanaka | G06F 3/017 382/103 |
| 2020/0012264 | A1* | 1/2020 | Kobayashi | G05B 19/418 |
| 2020/0174445 | A1* | 6/2020 | Hisayuki | G05B 19/402 |
| 2020/0293027 | A1* | 9/2020 | Fujitsuka | G05B 19/4184 |
| 2021/0087795 | A1* | 3/2021 | Volkel | E02F 9/264 |

FOREIGN PATENT DOCUMENTS

| | | |
|---|---|---|
| JP | 2011118763 A | 6/2011 |
| JP | 2012008974 A | 1/2012 |
| KR | 1020110061983 A | 6/2011 |
| KR | 1020130112098 A | 10/2013 |

OTHER PUBLICATIONS

Extended European Search Report of International Application No. PCT/JP2017/035063 dated Jan. 27, 2020; 8pp.

* cited by examiner

# ANALYSIS DEVICE AND ANALYSIS METHOD FOR PREPARATORY WORK TIME IN PAPER CONVERTING MACHINE

RELATED APPLICATIONS

The present application is a National Phase of International Application Number PCT/JP2017/035063 filed Sep. 27, 2017.

TECHNICAL FIELD

The present invention relates to an analysis device and an analysis method for analyzing a preparatory work time for activating a production line in a paper converting machine such as a corrugated cardboard sheet manufacturing device and a box making machine.

BACKGROUND ART

For example, a corrugating machine as a manufacturing device for a corrugated cardboard sheet includes a single facer configured to form a one-sided corrugated cardboard sheet, and a double facer configured to form a double-sided corrugated cardboard sheet by bonding a front liner paper to the one-sided corrugated cardboard sheet. The single facer processes a core paper into a wavy form and bonds a rear liner to the paper to form a one-sided corrugated cardboard sheet, and the double facer bonds a front liner to the one-sided corrugated cardboard sheet to form a double-sided corrugated cardboard sheet. Then, the double-sided corrugated cardboard sheet is cut into predetermined widths and predetermined lengths, and thus plate-shaped corrugated cardboard sheets are obtained.

In addition, the box making machine processes the plate-shaped corrugated cardboard sheet to manufacture a corrugated cardboard box, and includes a sheet feeding unit, a printing unit, a slotter creaser unit, a die cutting unit, a folding unit, and a counter ejector unit. The sheet feeding unit sends corrugated cardboard sheets one by one, and the printing unit performs printing on the surface of the corrugated cardboard sheet. The slotter creaser unit forms a ruled line serving as a folding line in the printed corrugated cardboard sheet and performs working for a slot forming a flap and/or a pasting piece for joining, and the die cutting unit performs a die cutting process for a hand hole and the like. The folding unit applies glue to the pasting piece and folds and joins it to manufacture a flat-shaped corrugated cardboard box, and the counter ejector unit stacks a predetermined number of flat-shaped corrugated cardboard boxes and ejects the boxes.

It is desirable that, with such a paper converting machine, the manufacturer of the corrugator and/or the box making machine acquire operation data of the corrugator and/or the box making machine supplied in the customer's facility to give advice to the customer for the purpose of making improvement in production efficiency and product quality, and making contribution to product development in the future. In view of this, it is conceivable to connect the server of the manufacturer and the control device of the corrugator and/or the box making machine installed in the customer's facility via a communication line, and store the operation data of the corrugator and/or the box making machine in the server of the manufacturer such that the operation data is analyzed to give advice to the customer. An example of such a technique is disclosed in Patent Document 1 described below.

CITATION LIST

Patent Documents

Patent Document 1: JP 2012-8974A

SUMMARY OF INVENTION

Problem to be Solved by the Invention

In a corrugating machine of a paper converting machine, a corrugated roll unit for processing core paper into a wavy form is required to be replaced in a case that corrugated cardboard sheets of different types are manufactured, for example. In addition, in a box making machine, various types of work, such as change of the printing die in the printing unit, ink cleaning, change of the plywood die, and position adjustment of various mechanisms, are required in a case that corrugated cardboard boxes of different types are manufactured. It is desirable that the above-mentioned preparatory work which is performed before the start of the manufacturing work for corrugated cardboard sheets and/or corrugated cardboard boxes be performed as quickly as possible in view of improving production efficiency.

To solve the above-mentioned problems, an object of the present invention is to provide an analysis device and an analysis method for a preparatory work time in a paper converting machine which can determine improvement points of the work by analyzing the work content of the preparatory work which is performed before the start of the manufacturing work, and can propose the improvement details for the purpose of improving production efficiency.

Solution to Problem

To achieve the above-mentioned object, an analysis device for a preparatory work time in a paper converting machine of the present invention analyzes a work content in the preparatory work time, the preparatory work being performed before activation of the paper converting machine, the analysis device including: a working position detection device configured to detect a working position of an operator in the preparatory work time; an action diagram creation unit configured to create an action diagram of the operator on a basis of a detection result of the working position detection device; a work content item table creation unit configured to create a work content item table indicating the work content in the preparatory work time in a unit of an item on a basis of operation processing data and paper converting machine operation data; and an operation process improvement item selection unit configured to select an improvement item of an operation process in the preparatory work time on a basis of a creation result of the action diagram creation unit and the work content item table creation unit.

Accordingly, an action diagram of the operator is created based on the working position of the operator in the preparatory work time, a work content item table indicating a work content in the preparatory work time for each item is created based on operation processing data and paper converting machine operation data, and an improvement item of the operation processes in the preparatory work time is selected based on the action diagram and the work content item table. As a result, an improvement point of work can be determined by analyzing the work content of the preparatory work which is performed before the start of the manufacturing work, and production efficiency can be improved by proposing details for improvement.

In the analysis device for the preparatory work time in the paper converting machine according to the present invention, the action diagram creation unit creates an action diagram of the operator which indicates changes in a working position and a working time of the operator with respect to component devices of the paper converting machine.

Accordingly, with the action diagram of the operator indicating the changes in the working position and the working time of the operator with respect to the component devices of the paper converting machine, work having a room for improvement and wasteful work of the operator can be determined, and proposal for improvement can be readily created.

In the analysis device for the preparatory work time in the paper converting machine according to the present invention, the work content item table creation unit includes an itemized working time graph creation unit configured to create an itemized working time graph indicating a working time in a unit of an item, the itemized working time graph indicating an operation content of the paper converting machine and a work content of the operator in such a manner that the operation content of the paper converting machine and the work content of the operator are separated from each other.

Accordingly, with itemized working time graph indicating the working time for each item in which the operation content of the paper converting machine and the work content of the operator are separated from each other, items having a room for improvement can be readily determined in the operation content of the paper converting machine and the work content of the operator.

In the analysis device for the preparatory work time in the paper converting machine according to the present invention, the work content item table creation unit includes a device working time graph creation unit configured to create a device working time graph indicating an operation content and a working time for each component device of the paper converting machine.

Accordingly, with the device working time graph indicating an operation content and a working time for each component device of the paper converting machine, improvement points in each component device of the paper converting machine can be readily recognized.

In the analysis device for the preparatory work time in the paper converting machine according to the present invention, the operation process improvement item selection unit selects, as the improvement item, a work item whose working time is longer than a normal working time.

Accordingly, by selecting a work item whose working time is longer than the normal working time as an improvement item, work efficiency can be improved by shortening the working time in the selected improvement items.

In the analysis device for the preparatory work time in the paper converting machine according to the present invention, the operation process improvement item selection unit selects, as the improvement item, a work item whose completion is a condition for a start of another work item.

Accordingly, by selecting, as an improvement item, a work item whose completion is a condition for a start of another work item, the work efficiency can be improved by shortening the working time in the selected improvement items and by advancing the start time of other work items.

In the analysis device for the preparatory work time in the paper converting machine according to the present invention, the operation process improvement item selection unit selects, as the improvement item, a work item in which a movement length of the operator is long.

Accordingly, by selecting, as the improvement item, a work item in which a movement length of the operator is long, the work efficiency can be improved by shortening the working time in the selected improvement item.

In the analysis device for the preparatory work time in the paper converting machine according to the present invention, the operation process improvement item selection unit sets in advance a number or a ratio of items to be selected as the improvement item.

Accordingly, by setting in advance a number or a ratio of items to be selected as the improvement item, improvement items can be efficiently selected.

The analysis device for the preparatory work time in the paper converting machine according to the present invention further includes an operation process improvement plan creation unit configured to create an improvement plan of an operation process for the improvement item selected by the operation process improvement item selection unit.

Accordingly, by creating an improvement plan of the operation process for selected improvement items, the created improvement plan of the operation process can be provided to the facility where the paper converting machine is supplied.

The analysis device for the preparatory work time in the paper converting machine according to the present invention, further includes a communication device capable of transmitting and/or receiving data with a control device of the paper converting machine, in which, by the communication device, operation data of the paper converting machine is received from the control device, and an operation process improvement plan of the paper converting machine is transmitted to at least one of the control device and a customer computer.

Accordingly, by collecting the operation data of the paper converting machine to create an operation process improvement plan, and by transmitting the created operation process improvement plan by the communication device, the operation process improvement plan created by the manufacturer of the paper converting machine can be readily provided to the facility where the paper converting machine is supplied.

In the analysis device for the preparatory work time in the paper converting machine according to the present invention, by the communication device, stop factor data of the paper converting machine is received from the control device, and a stop factor analysis result of the paper converting machine is transmitted to at least one of the control device and the customer computer.

Accordingly, an improvement plan can be created by analyzing the stop factor based on the stop factor data, and a stop factor analysis result and/or an improvement plan can be readily proposed to the facility where the paper converting machine is supplied.

In the analysis device for the preparatory work time in the paper converting machine according to the present invention, by the communication device, position adjustment data of the paper converting machine is received from the control device, and a determination result of the position adjustment data of the paper converting machine is transmitted to at least one of the control device and the customer computer.

Accordingly, with a server storing an optimum value of position adjustment data of the paper converting machine, a determination result of the position adjustment data of the paper converting machine which is being adjusted can be readily determined based on the position adjustment data, and advice can be given to the facility where the paper converting machine is supplied.

In the analysis device for the preparatory work time in the paper converting machine according to the present invention, by the communication device, the operation data of the paper converting machine is received from the control device, and a component failure analysis result of the paper converting machine is transmitted to at least one of the control device and the customer computer.

Accordingly, by performing the component failure analysis of the paper converting machine based on the operation data of the paper converting machine, replacement work of the failure component can be quickly proposed and implemented.

In the analysis device for the preparatory work time in the paper converting machine according to the present invention, by the communication device, the operation data of the paper converting machine is received from the control device, and a component remaining service life analysis result of the paper converting machine is transmitted to at least one of the control device and the customer computer.

Accordingly, by analyzing the component remaining service time of the paper converting machine based on the operation data of the paper converting machine, the proper timing of replacement work of the expendable component can be proposed and implemented.

In the analysis device for the preparatory work time in the paper converting machine according to the present invention, the communication device transmits the component remaining service life analysis result of the paper converting machine before a period calculated by adding a number of days until a component is supplied to a scheduled component replacement date.

Accordingly, with the transmission at a timing in consideration of the component replacement timing and component supply timing, the inventories in the customers' facility can be reduced, and the components can be replaced at a suitable timing.

In the analysis device for the preparatory work time in the paper converting machine according to the present invention, by the communication device, the operation data of the paper converting machine is received from the control device, and a diagnostic analysis result of the paper converting machine is transmitted to at least one of the control device and the customer computer.

Accordingly, by performing the diagnosis analysis of the paper converting machine based on the operation data of the paper converting machine, whether the operation state of the running paper converting machine is normal can be determined, and the operation state of the paper converting machine can be notified before abnormality occurs.

An analysis method of a preparatory work time the present invention is a method of analyzing a work content in a preparatory work time in a paper converting machine, the preparatory work being performed before activation of the paper converting machine, the method including creating an action diagram of an operator on a basis of a working position of the operator in the preparatory work time; creating a work content item table indicating the work content in the preparatory work time in a unit of an item on a basis of operation processing data and paper converting machine operation data; and selecting an improvement item of an operation process in the preparatory work time on a basis of the action diagram and the work content item table.

Accordingly, an improvement point of work can be determined by analyzing the work content of the preparatory work which is performed before the start of the manufacturing work, and production efficiency can be improved by proposing details for improvement.

Advantageous Effect of Invention

With the analysis device and the analysis method of the present invention for a preparatory work time in the paper converting machine, improvement points of the work can be determined by analyzing the work content of the preparatory work which is performed before the start of the manufacturing work, and production efficiency can be improved by proposing details for improvement.

DESCRIPTION OF EMBODIMENTS

An analysis device and an analysis method for a preparatory work time in a paper converting machine according to an embodiment of the present invention are described in detail below with reference to the accompanying drawings. Note that the present invention is not limited by the embodiment, and when a plurality of embodiments is present, the present invention is intended to include a configuration combining these embodiments.

Figure 8:
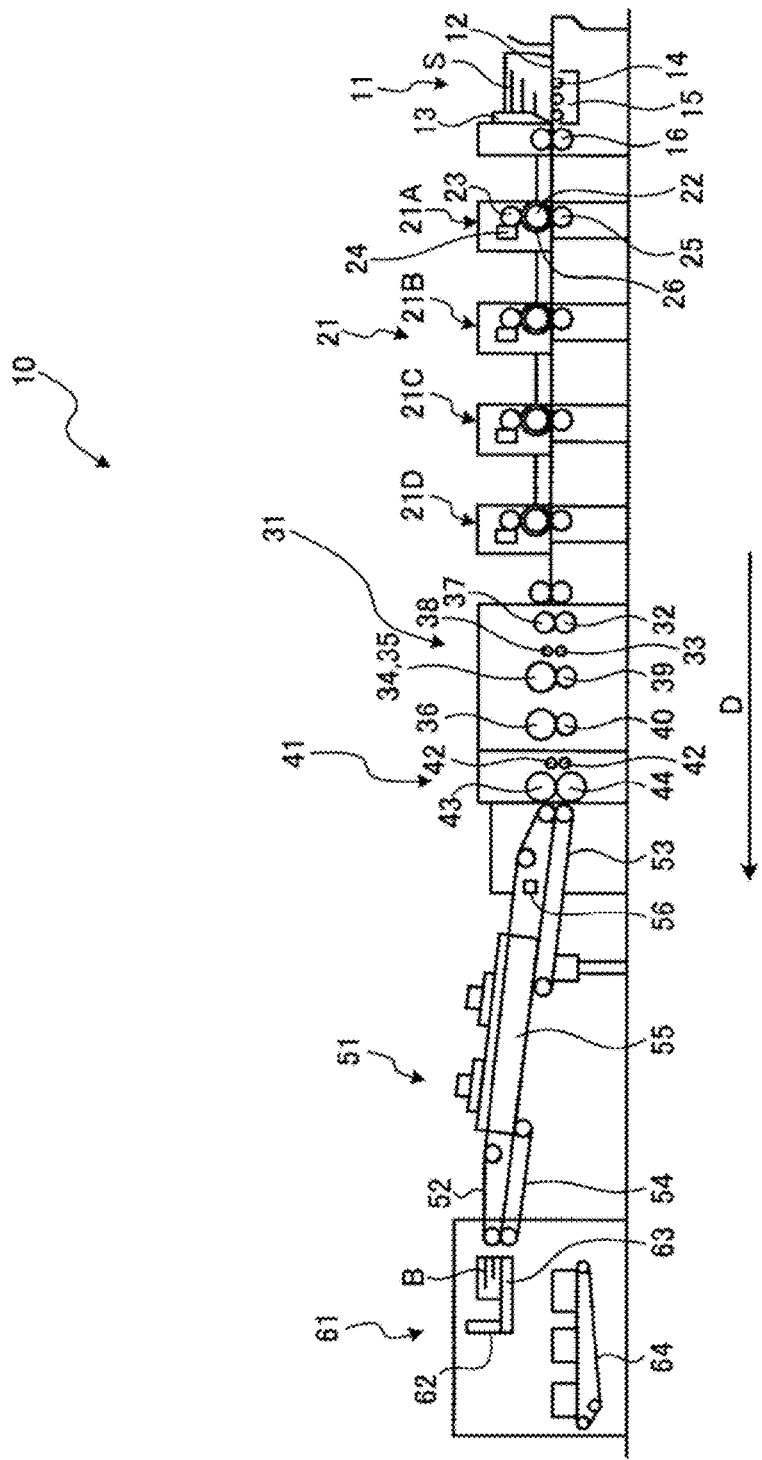
FIG. 8 is a schematic configuration diagram illustrating the box making machine of the present embodiment.

FIG. 8 is a schematic configuration diagram illustrating a box making machine of the present embodiment.

In the present embodiment, as illustrated in FIG. 8, a box making machine 10 manufactures a corrugated cardboard box (case) B by processing a corrugated cardboard sheet S. The box making machine 10 includes a sheet feeding unit 11, a printing unit 21, a slotter creaser unit 31, a die cutting unit 41, a folding unit 51, and a counter ejector unit 61 which are linearly disposed in a direction D in which corrugated cardboard sheets S and corrugated cardboard boxes B are transported.

The sheet feeding unit 11 sends corrugated cardboard sheets S one by one at a constant speed to the printing unit 21. The sheet feeding unit 11 includes a table 12, a front stopper 13, a supply roller 14, a suction device 15, and a feed roll 16. A large number of corrugated cardboard sheets S can be stacked on the table 12, and the table 12 is supported in a vertically movable manner. The front stopper 13 can set the position of the front end position the corrugated cardboard sheets S stacked on the table 12, and includes a gap through which one corrugated cardboard sheet S can pass between the table 12 and the lower end portion of the front stopper 13. The supply roller 14 includes a plurality of the supply rollers 14 disposed in the transport direction D of a corrugated cardboard sheet S so as to correspond to the table 12 such that, when the table 12 is lowered, the lowermost corrugated cardboard sheet S of the large number of stacked corrugated cardboard sheets S can be sent forward. The suction device 15 sucks the stacked corrugated cardboard sheets S downward, or in other words, toward the table 12 side and the supply roller 14 side. The feed roll 16 can supply, to the printing unit 21, a corrugated cardboard sheet S sent by the supply roller 14.

The printing unit 21 performs multi-color printing (in the present embodiment, four-color printing) on the surface of a corrugated cardboard sheet S. The printing unit 21 includes four printing units, 21A, 21B, 21C and 21D, disposed in series, and can perform printing with four ink colors on the surface of a corrugated cardboard sheet S. The printing units 21A, 21B, 21C and 21D have substantially the same configuration, and each of the printing units 21A, 21B, 21C and 21D includes a printing cylinder 22, an ink supply roll (anilox roll) 23, an ink chamber 24, and a receiving roll 25. The printing cylinder 22 includes a printing die 26 attached on the outer periphery of the printing cylinder 22, and is provided in a rotatable manner. The ink supply roll 23 is disposed in a region near the printing cylinder 22 such that the ink supply roll 23 is adjacently opposite to the printing die 26, and is provided in a rotatable manner. The ink chamber 24 stores ink, and is provided in a region near the ink supply roll 23. The receiving roll 25 transports a corrugated cardboard sheet S while applying a predetermined printing pressure by sandwiching the corrugated cardboard sheet S between the receiving roll 25 and the printing cylinder 22, and is provided below the printing cylinder 22 in a rotatable manner so as to face the printing cylinder 22. Although not illustrated in the drawings, a pair of upper and lower sending rolls is provided in front and behind each of the printing units 21A, 21B, 21C and 21D.

The slotter creaser unit 31 includes a slotter device, and performs a ruling process and a slotting process on a corrugated cardboard sheet S. The slotter creaser unit 31 includes a first ruling roll 32, a second ruling roll 33, a slitter head 34, a first slotter head 35, and a second slotter head 36.

The first ruling roll 32 is formed in a round shape, and a plurality of (in the present embodiment, four) first ruling rolls 32 are disposed at a predetermined interval in a horizontal direction orthogonal to the transport direction D of a corrugated cardboard sheet S such that the first ruling rolls 32 are rotatable with a drive device not illustrated. The second ruling roll 33 is formed in a round shape, and a plurality of (in the present embodiment, four) second ruling rolls 33 are disposed at a predetermined interval in a horizontal direction orthogonal to the transport direction D of a corrugated cardboard sheet S such that the second ruling rolls 33 are rotatable with a drive device not illustrated. In this case, the first ruling roll 32 disposed on the lower side is designed for performing a ruling process on the rear surface (bottom surface) of a corrugated cardboard sheet S, and the second ruling roll 33 disposed on the lower side is designed for performing a ruling process on the rear surface (bottom surface) of a corrugated cardboard sheet S as with the first ruling roll 32, and, receiving rolls 37 and 38 are oppositely provided above respective ruling rolls 32 and 33 such that the receiving rolls 37 and 38 can synchronously rotate.

Each of the slitter head 34 and the first slotter head 35 is formed in a round shape, and a plurality of (in the present embodiment, five) slotter heads 34 and 35 are disposed at a predetermined interval in a horizontal direction orthogonal to the transport direction D of a corrugated cardboard sheet S such that the slitter head 34 and the first slotter head 35 are rotatable with the drive device not illustrated. The slitter head 34, which includes one slitter head, is provided to correspond to an end portion, in the width direction, of a corrugated cardboard sheet S being transported, and can cut the end portion of the width direction of the corrugated cardboard sheet S. The first slotter head 35, which includes four slotter heads, is provided to correspond to a predetermined position, in the width direction, of a corrugated cardboard sheet S being transported, and can perform a slotting process and a gluing margin process at the predetermined position of the corrugated cardboard sheet S. The second slotter head 36, which includes four slotter heads, is provided to correspond to a predetermined position, in the width direction, of a corrugated cardboard sheet S being transported, and can perform a slotting process and a gluing margin process at the predetermined position of the corrugated cardboard sheet S. In this case, a lower head 39 is oppositely provided below the slitter head 34 and the first slotter head 35 in a synchronously rotatable manner, and a lower head 40 is oppositely provided below the second slotter head 36 in a synchronously rotatable manner.

The die cutting unit 41 performs a die cutting process, for a hand hole and the like, on a corrugated cardboard sheet S. The die cutting unit 41 includes a pair of upper and lower sending rolls 42, an anvil cylinder 43 and a knife cylinder 44. The sending roll 42 transports a corrugated cardboard sheet S by sandwiching the corrugated cardboard sheet S from the upper and lower sides, and is provided in a rotatable manner. Each of the anvil cylinder 43 and the knife cylinder 44 is formed in a round shape, and is synchronously rotatable with a drive device not illustrated. In this case, an anvil is formed on the outer periphery portion of the anvil cylinder 43, and a blade attaching base (die cutting blade) is attached at a predetermined position on the outer periphery portion of the knife cylinder 44.

The folding unit 51 folds a corrugated cardboard sheet S while carrying the corrugated cardboard sheet S in the transport direction D, and forms a flat-shaped corrugated cardboard box B by joining the both end portions in the width direction. The folding unit 51 includes an upper transport belt 52, lower transport belts 53 and 54, and a shaping device 55. The upper transport belt 52 and the lower transport belts 53 and 54 transport a corrugated cardboard sheet S and a corrugated cardboard box B by sandwiching the corrugated cardboard sheet S and the corrugated cardboard box B from the upper and lower sides. The shaping device 55 includes a pair of left and right shaping belts, and folds the end portions of the width direction of a corrugated cardboard sheet S while bending the end portions downward with the shaping belts. In addition, the folding unit 51 includes a gluing device 56. The gluing device 56 includes a glue gun, and can perform gluing at a predetermined position of a corrugated cardboard sheet S by discharging glue at a predetermined timing.

The counter ejector unit 61 stacks corrugated cardboard boxes B while counting the corrugated cardboard boxes B, groups the corrugated cardboard boxes B into a predetermined number of batches, and then ejections the corrugated cardboard boxes B. The counter ejector unit 61 includes a hopper device 62. The hopper device 62 includes a vertically movable elevator 63 on which corrugated cardboard boxes B are stacked, and the elevator 63 includes, as shaping members, a front stopper plate and a square shaping plate not illustrated. Note that a carry-out conveyor 64 is provided below the hopper device 62.

Corrugated cardboard sheets S are stacked on the table 12 of the sheet feeding unit 11. In the sheet feeding unit 11, a large number of corrugated cardboard sheets S stacked on the table 12 are positioned by the front stopper 13, and then the lowermost corrugated cardboard sheet S is sent out by the plurality of supply rollers 14 when the table 12 is lowered. Then, the corrugated cardboard sheet S is supplied to the printing unit 21 by a pair of the feed rolls 16 at a predetermined constant speed.

In the printing unit 21, ink is supplied on the surface of the ink supply roll 23 from the ink chamber 24 in each of the printing units 21A, 21B, 21C and 21D, and when the printing cylinder 22 and the ink supply roll 23 rotate, the ink on the surface of the ink supply roll 23 is transferred to the printing die 26. Then, when a corrugated cardboard sheet S is transported between the printing cylinder 22 and the receiving roll 25, the corrugated cardboard sheet S is sandwiched between the printing die 26 and the receiving roll 25, and a printing pressure is exerted on the corrugated cardboard sheet S such that printing is performed on the surface of the corrugated cardboard sheet S. The printed corrugated cardboard sheet S is transported to the slotter creaser unit 31 by the sending roll.

In the slotter creaser unit 31, when the corrugated cardboard sheet S passes through the first ruling roll 32, a ruled line is formed on the rear surface side (rear liner side) of the corrugated cardboard sheet S. Likewise, when the corrugated cardboard sheet S passes through the second ruling roll 33, a ruled line is again formed on the rear surface side of the corrugated cardboard sheet S. When the corrugated cardboard sheet S passes through the slitter head 34, one end portion is cut at a cutting position, and when the corrugated cardboard sheet S passes through the first slotter head 35, a groove is formed at a position on the upstream side of the ruled line. At this time, the end portion on the upstream side is cut at a cutting position of the ruled line. When the corrugated cardboard sheet S passes through the second slotter head 36, a groove is formed at a position on the downstream side of the ruled line. At this time, the end portion on the downstream side is cut at a cutting position of the ruled line, and a pasting piece (joining piece) is formed. Thereafter, the ruled and grooved corrugated cardboard sheet S is transported to the die cutting unit 41.

In the die cutting unit 41, when a corrugated cardboard sheet S passes between the anvil cylinder 43 and the knife cylinder 44, a hand hole is formed. Then, the corrugated cardboard sheet S in which the hand hole is formed is transported to the folding unit 51.

In the folding unit 51, while a corrugated cardboard sheet S is carried in the transport direction D by the upper transport belt 52 and the lower transport belts 53 and 54, glue is applied to the pasting piece by the gluing device 56, and then the corrugated cardboard sheet S is bent downward at the ruled line by the shaping device 55. When the corrugated cardboard sheet S is folded at about 180 degrees, the folding force becomes strong, and the pasting piece and the end portion of the corrugated cardboard sheet S overlapping the pasting piece are pressed against each other and brought into intimate contact with each other such that the both end portions of the corrugated cardboard sheet S are joined together, and thus, a corrugated cardboard box B is obtained. Then, the corrugated cardboard box B is transported to the counter ejector unit 61.

In the counter ejector unit 61, the corrugated cardboard box B which is determined to be a conforming item is sent to the hopper device 62. The end portion, in the transport direction D, of the corrugated cardboard box B sent to the hopper device 62 hits the front stopper plate, and shaped by the square shaping plate, and in this state, the corrugated cardboard boxes B are stacked on the elevator 63. Then, when a predetermined number of corrugated cardboard boxes B are stacked on the elevator 63, the elevator 63 is lowered, and the predetermined number of corrugated cardboard boxes B in one batch are ejected by the carry-out conveyor 64 and sent to subsequent stages of the box making machine 10.

Figure 1:
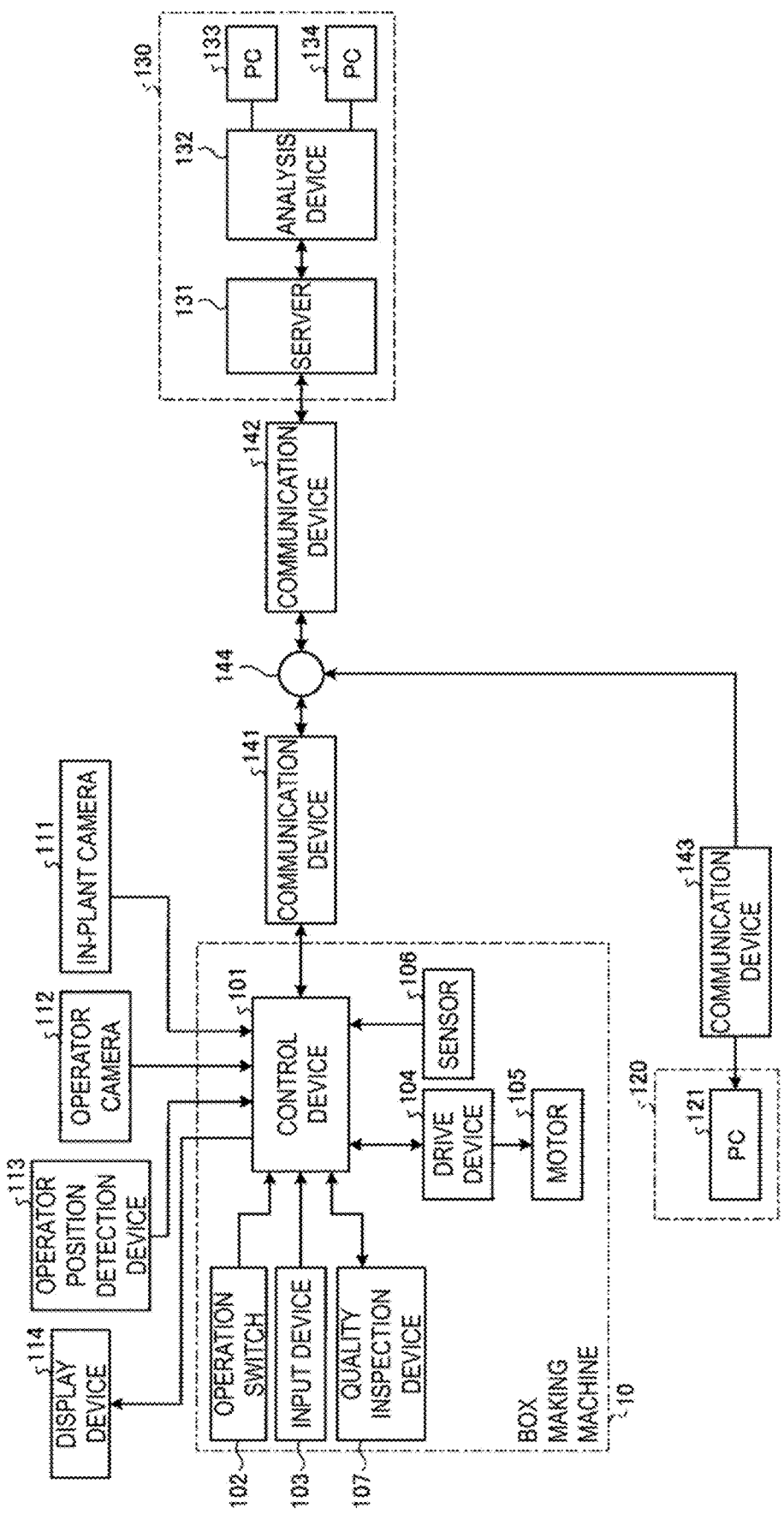
FIG. 1 is a general configuration diagram illustrating a system of an analysis device for a preparatory work time in a box making machine.

In the present embodiment, the above-described the box making machine 10 is adopted as a paper converting machine, and the box making machine 10 is provided with an analysis device for a preparatory work time. A system of the analysis device for a preparatory work time in the box making machine 10 is described below. FIG. 1 is a general configuration diagram illustrating the system of the analysis device for the preparatory work time in the box making machine.

As illustrated in FIG. 1, the box making machine 10 is installed in a manufacturing plant, and includes a control device 101. An operation switch 102 and an input device 103 of the box making machine 10 are connected with the control device 101. Examples of the operation switch 102 include various types of switches such as an operation start switch and an operation stop switch. Examples of the input device 103 include a keyboard and a microphone. In addition, a motor 105 is connected with the control device 101 via a drive device 104 of the box making machine 10, and a sensor 106 is connected with the control device 101. The drive device 104 and the motor 105 activate the devices of the box making machine 10, and the sensor 106 detects the operation state (position, speed, temperature, vibration and the like) of the box making machine 10. Further, a quality inspection device 107, which inspects the quality of a corrugated cardboard box B manufactured with the box making machine 10, is connected with the control device 101. The quality inspection device 107 inspects whether a gap of both end portions of a corrugated cardboard box B whose end portion is bent inward falls within a set in advance predetermined range, for example.

The manufacturing plant where the box making machine 10 is installed is provided with an in-plant camera 111 that monitors the operation state of the box making machine 10. In addition, the operator who operates and drives the box making machine 10 is wearing an operator camera 112 for displaying an image that is identical to the operator's view. In addition, the operator is wearing an operator position detection device 113 that detects the working position in the plant. The operator position detection device 113 may use Global Positioning System (GPS), for example. The control device 101 is connected with the in-plant camera 111, the operator camera 112 and the operator position detection device 113, and receives a captured image and/or a detection result. Note that the in-plant camera 111, the operator camera 112 and the operator position detection device 113 may be connected with a communication network 144, not via the control device 101.

The control device 101 is connected with a display device 114. The display device 114 is a display, and displays operation data of the box making machine 10 and the like.

A customers' management office 120 is provided in the manufacturing plant where the box making machine 10 is installed or adjacent to the manufacturing plant, and the management office 120 is provided with a personal computer (or, a mobile terminal or the like) 121.

A manufacturer's head office 130 is provided with a server 131, and the server 131 is connected with an analysis device 132. The analysis device 132 is connected with a plurality of personal computers (or, a mobile terminal and the like) 133 and 134. Examples of the plurality of personal computers 133 and 134 include the management division, the engineering division, the sales division.

The control device 101 of the box making machine 10 is connected with a communication device 141, the server 131 of the manufacturer's head office 130 is connected with a communication device 142, and the personal computer 121 of the management office 120 is connected with a communication device 143. The communication devices 141, 142 and 143 can transmit and receive data via the communication network 144. Examples of the communication network 144 include an internet line, a dedicated line, and a mobile phone line.

Figure 2:
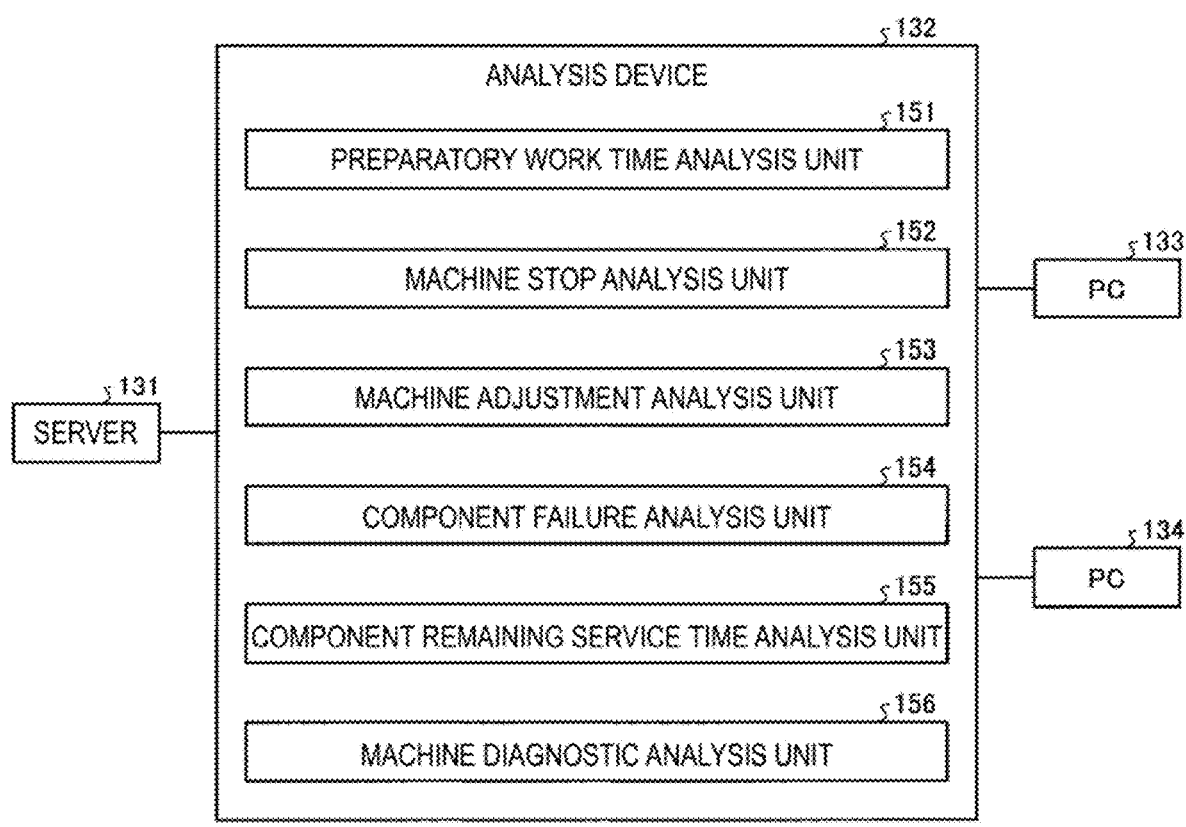
FIG. 2 is a schematic configuration diagram illustrating the analysis device.

Now, the analysis device for a preparatory work time of the box making machine of the present embodiment is described. FIG. 2 is a schematic configuration diagram illustrating the analysis device.

As illustrated in FIG. 2, the analysis device 132 includes a preparatory work time analysis unit 151, a machine stop analysis unit 152, a machine adjustment analysis unit 153, a component failure analysis unit 154, a component remaining service time analysis unit 155, and a machine diagnostic analysis unit 156. The preparatory work time analysis unit 151 analyzes the work content in the preparatory work time which is performed before the activation of the box making machine 10 based on the motion of the operator operating the box making machine 10, operation processing data which is set in advance and input in the control device 101, operation data of the box making machine 10 and the like. Note that the details of the preparatory work time analysis unit 151 are described later.

The machine stop analysis unit 152 analyzes the cause of stoppage of the box making machine 10 during manufacture of a corrugated cardboard box B by the box making machine 10. The machine stop analysis unit 152 analyzes the cause of stoppage of the box making machine 10 based on stop factor data of the box making machine 10, the operation speed, and the past error history, and the quality management data. After analyzing the cause of stoppage of the box making machine 10, the machine stop analysis unit 152 can create an improvement plan for the cause of the stoppage, and can propose the plan to the customer through the communication network 144. Note that the collection of the stop factor data of the box making machine 10 is performed by inputting the stop factor data by the operator using the input device 103 in the state where the box making machine 10 is stopped, and it is preferable that the box making machine can be reactivated when the operator inputs stop factor data.

At the start of manufacture of a corrugated cardboard box B by the box making machine 10, the machine adjustment analysis unit 153 analyzes position adjustment work of the devices in the box making machine 10. Examples of the position adjustment work of the devices include adjustment work of a printing position of a corrugated cardboard sheet S in the printing unit 21, adjustment work of a ruling position and/or a slotting process position of a corrugated cardboard sheet S in the slotter creaser unit 31, position adjustment work of a die cutting process of a corrugated cardboard sheet S in the die cutting unit 41, adjustment work of folding position of a corrugated cardboard sheet S in the folding unit 51 and the like. The machine adjustment analysis unit 153 acquires and stores, for each type of corrugated cardboard boxes B, reference position data for position adjustment of the devices in the box making machine 10 and data of the optimum adjustment values adjusted by the operator. With this configuration, at the start of manufacture of a cardboard box B by the box making machine 10, the adjustment value of the position adjusted by the operator and the stored optimum adjustment value are compared with each other to determine whether the position adjustment work is proper. When the position adjustment work of the device is not proper, advice can be given to the operator through the communication network 144.

The component failure analysis unit 154 monitors the operation state of the box making machine 10 during manufacture of a corrugated cardboard box B by the box making machine 10, and analyzes failures of the devices based on the operation state of the box making machine 10. The component failure analysis unit 154 detects the sound, the vibration value, the temperature, the current value, and the torque of the motor, and the like, and, when the difference between the detection value and the optimum value exceeds a set in advance deviation value, the component failure analysis unit 154 determines that motor abnormality is caused, for example. When the component failure analysis unit 154 determines that motor abnormality is caused, advice can be given to the operator through the communication network 144.

The component remaining service time analysis unit 155 monitors the operated periods of the devices in the box making machine 10, and analyzes the remaining service time of the devices based on the operated periods of the devices. The component remaining service time analysis unit 155 detects the torque of the motor and the like, and estimates the remaining service time of the motor and an associated driving component based on a change in the detection value with respect to the operated period of the devices, for example. The component remaining service time analysis unit 155 can estimate the replacement timing of the motor and an associated driving component based on the remaining service time of the motor and the associated driving component, and can give advice to the operator through the communication network 144.

The machine diagnostic analysis unit 156 monitors the operation state of the box making machine 10 during manufacture of a corrugated cardboard box B by the box making machine 10, and performs a predictive diagnosis of the machine based on the operation state of the box making machine 10. The machine diagnostic analysis unit 156 detects the torque of the motor and the like, and determines abnormality of the motor and an associated driving component based on a deviation value between the detection value and the optimum value, for example. When abnormality of the motor and the associated driving component is determined, the machine diagnostic analysis unit 156 can give advice to the operator and output an alarm through the communication network 144 to prevent occurrence of failure of the machine.

Figure 3:
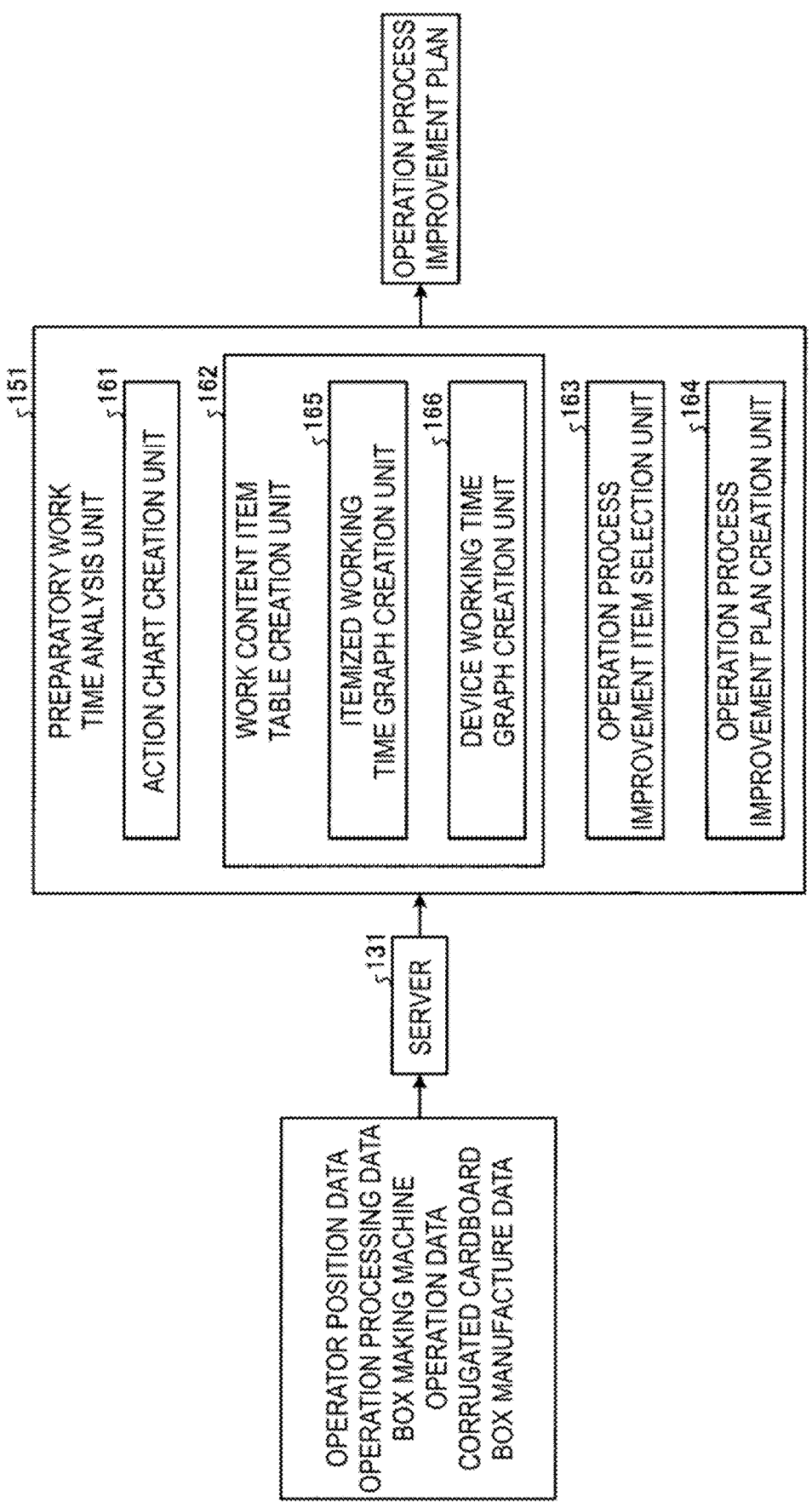
FIG. 3 is a schematic configuration diagram illustrating a preparatory work time analysis unit.

Now, the preparatory work time analysis unit 151 is elaborated. FIG. 3 is a schematic configuration diagram illustrating the preparatory work time analysis unit.

As illustrated in FIG. 3, the preparatory work time analysis unit 151 analyzes the work content in the preparatory work time which is performed before the activation of the box making machine (paper converting machine). The preparatory work time analysis unit 151 includes an action diagram creation unit 161, a work content item table creation unit 162, an operation process improvement item selection unit 163, and an operation process improvement plan creation unit 164. Further, the work content item table creation unit 162 includes an itemized working time graph creation unit 165, and a device working time graph creation unit 166.

The action diagram creation unit 161 creates an action diagram of the operator based on the working position of the operator. An image captured by the in-plant camera 111, an image captured by the operator camera 112, and a detection result of the operator position detection device 113 are input to the control device 101 of the box making machine 10. The captured images of the cameras 111 and 112 and the detection result of the operator position detection device 113 are input to the server 131 via the communication devices 141 and 142 and the communication network 144, and the action diagram creation unit 161 can determine the working position of the operator in the preparatory work time of the box making machine 10 based on operation data and operation processing data of the box making machine 10 in addition to the above-mentioned data.

The action diagram creation unit 161 creates an action diagram of the operator based on the working position of the operator in the preparatory work time of the box making machine 10. This action diagram indicates changes in a working position and a working time of the operator with respect to component devices the box making machine 10.

Figure 4:
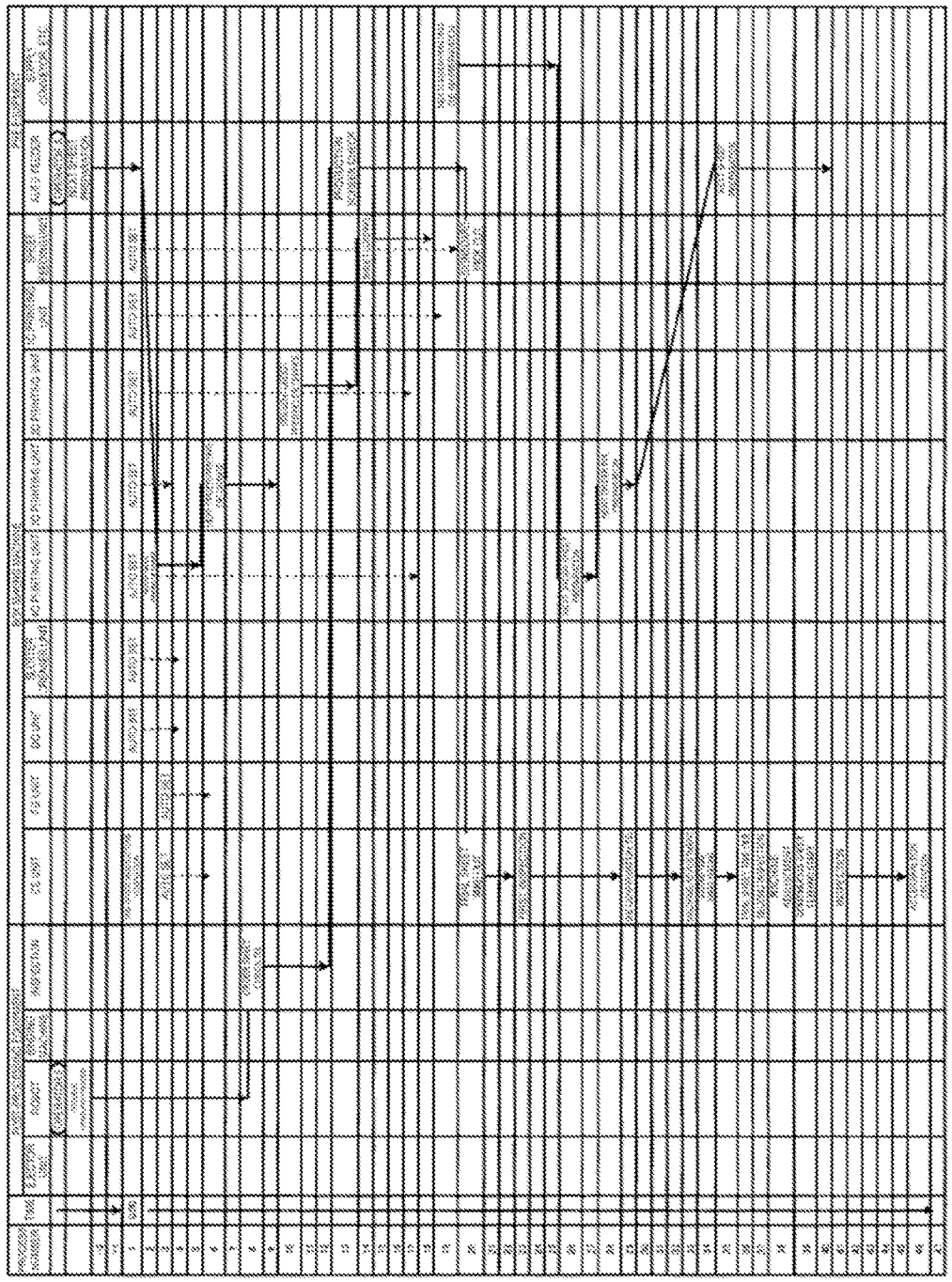
FIG. 4 is an action diagram illustrating a work content of an operator in a preparatory period of the box making machine.

FIG. 4 is an action diagram illustrating a work content of an operator in a preparatory period of the box making machine. In the action diagram of an operator of FIG. 4, the abscissa indicates component devices of the box making machine 10, and namely, from right, a supply conveyor, an auto feeder, the sheet feeding unit 11, a 1C printing unit 21A, a 2C printing unit 21B, a 3C printing unit 21C, a 4C printing unit 21D, the slotter creaser unit 31, the die cutting (DC) unit 41, the folding (FG) unit 51, the counter ejector unit (CE) 61, inspection, a binding machine, a robot, and the ejector unit. The ordinate indicates time denoted with process numbers, and the position between "−1" and "1" is the activation position. In the present embodiment, preparatory work is performed by two operators.

The action diagram of the operator created by the action diagram creation unit 161 is described below. In the action diagram of the operator as illustrated in FIG. 4, at the process number "−2", an operator A starts preparation of the corrugated cardboard sheet S to be used at the next step, which is continued until the process number "1". At the process number "−1", manufacture (order manufacture) of the corrugated cardboard box B of the preceding step is completed, and auto set of the next step is started at the sheet feeding unit 11, the 1C printing unit 21A, the 2C printing unit 21B, the 3C printing unit 21C, the 4C printing unit 21D, the slotter creaser unit 31, and the die cutting (DC) unit 41, and in addition, at the process number "3", auto set is started at the folding (FG) unit 51 and the counter ejector unit (CE) 61. At the process number "1", the operator A moves to the 4C printing unit 21D, and moves in the order of the 4C printing unit 21D, the 3C printing unit 21C, the 2C printing unit 21B, and the sheet feeding unit 11 from the process number "3" to the process number "18" to perform change of a printing die and loading of the corrugated cardboard sheet S.

At the process number "18", the operator A moves to the supply conveyor and the like, and performs preparatory work of the next printing die and/or the ink to be used from the process number "19" to the process number "25". Thereafter, at the process number "25", the operator A moves to the 4C printing unit 21D, and moves in the order of the 4C printing unit 21D, the 3C printing unit 21C and the auto feeder from the process number "26" to the process number "40", and performs preparatory work of the next printing die and preparatory work of the corrugated cardboard sheet S.

On the other hand, an operator B has performed a trouble handling process in the preceding steps up to the process number "8" with the robot, and moves to inspection at the process number "8", and confirms the corrugated cardboard box B of the next step from the process number "9" to the process number "12". Thereafter, the operator B moves to the auto feeder at the process number "13", and checks a production screen until the process number "20". Then, at the process number "20", the operator B picks out a signboard while moving, and moves to the counter ejector unit (CE) 61. Here, a manufactured trial corrugated cardboard box B is taken put at the process number "20", the first one is inspected at the process number "24", and confirmation work of the die is performed at the process number "29". Thereafter, adjustment work is performed at the process number "33", a second trial corrugated cardboard box B is manufactured at the process number "34", a manufactured trial corrugated cardboard box B is taken out at the process number "36", and second inspection is performed at the process number "37". The adjustment work is again performed at the process number "38", continuous manufacture of corrugated cardboard boxes B is started at the process number "39", inspection is performed from the process number "41", and then the normal operation is started while increasing the operation speed at the process number "46".

As illustrated in FIG. 3, the work content item table creation unit 162 creates a work content item table indicating a work content for each item in the preparatory work time based on operation processing data and paper converting machine operation data, and includes the itemized working time graph creation unit 165 and the device working time graph creation unit 166.

The itemized working time graph creation unit 165 creates an itemized working time graph indicating the working time for each item in which the operation content of the box making machine 10 and the work content of the operator are separated from each other. In addition, the device working time graph creation unit 166 creates a device working time graph indicating an operation content and a working time of each component device of the box making machine 10.

Figure 5:
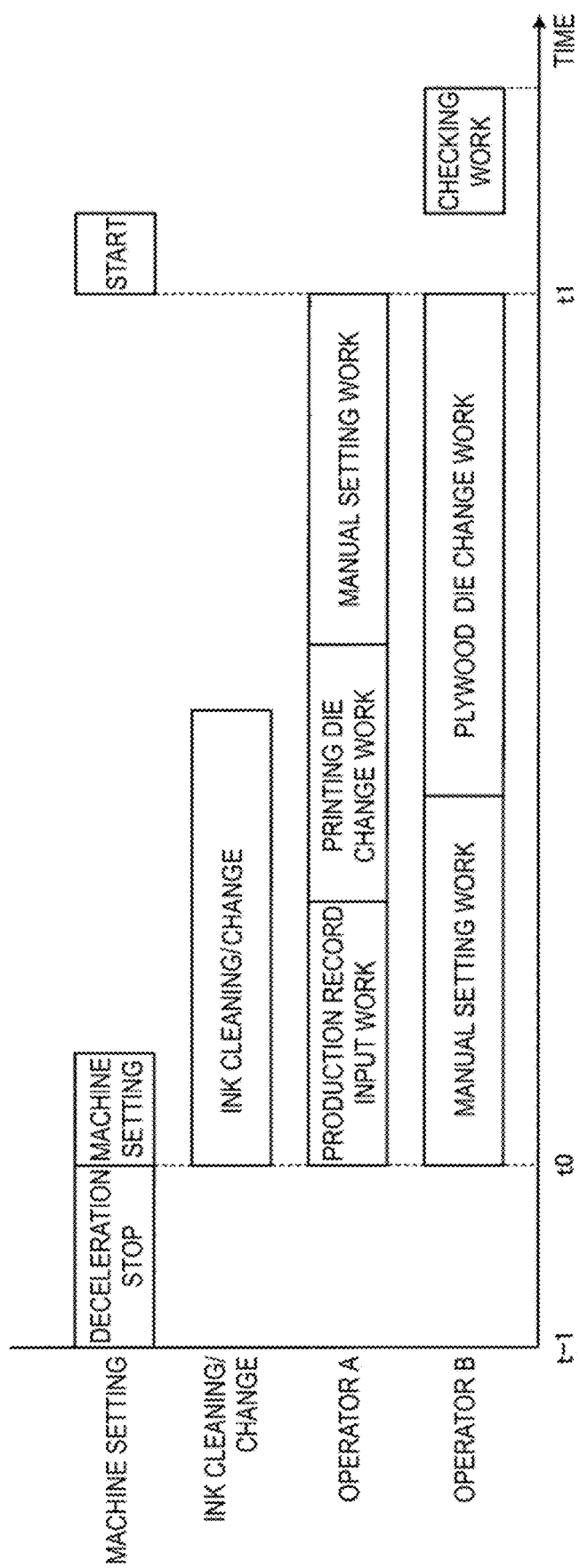
FIG. 5 is an itemized working time graph in a preparatory period of the box making machine.
Figure 6:
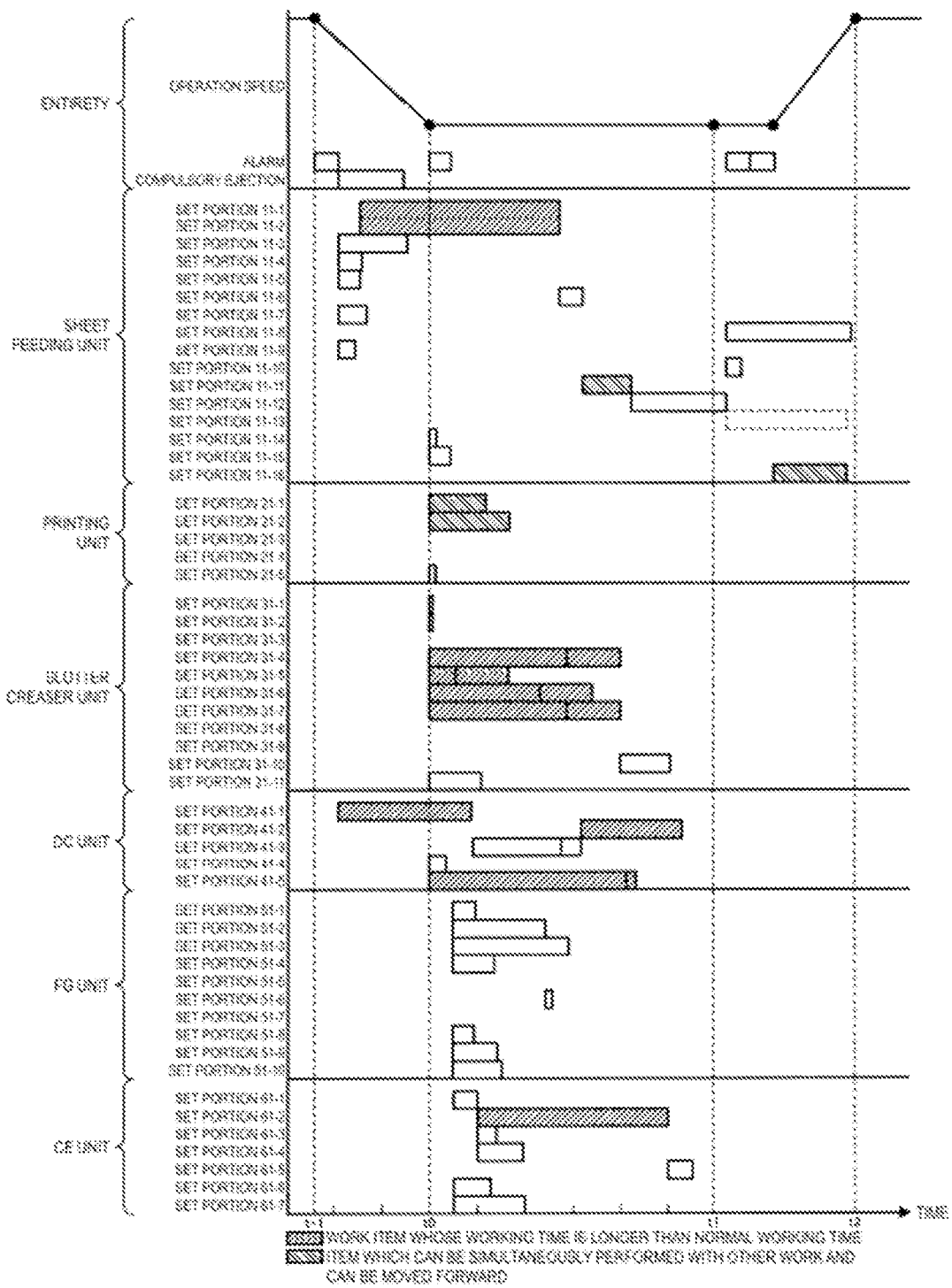
FIG. 6 is a device working time graph in a preparatory period of the box making machine of the current state.

FIG. 5 is an itemized working time graph in a preparatory period of the box making machine, and FIG. 6 is a device working time graph in a preparatory period of the box making machine of the current state. In the graphs of FIG. 5 and FIG. 6, the abscissa indicates time, and "t0" is a reference position (start of preparatory work).

In the itemized working time graph as illustrated in FIG. 5, in the item "MACHINE SETTING", deceleration stop of the box making machine 10 is performed from time t-1 to time t0, and machine setting of the box making machine 10 for the corrugated cardboard box B to be manufactured at the next step is performed from time t0. In the item "INK CLEANING/CHANGE", from time t0, ink cleaning and/or ink change is performed in the printing unit 21. In the item "OPERATOR A", production record input work, printing die change work, and manual setting work are performed from time t0. In the item "OPERATOR B", manual setting work and plywood die change work are performed, and checking work is performed after activation of the machine (machine activation and trial sheet passage) from time t0.

As illustrated in FIG. 6, the device working time graph indicates details of the itemized working time graph illustrated in FIG. 5, and indicates the operation times of the devices in the sheet feeding unit 11, the printing unit 21, the slotter creaser unit 31, the die cutting (DC) unit 41, the folding (FG) unit 51 and the counter ejector unit (CE) 61. With this graph, the preparatory times of respective devices can be understood.

As illustrated in FIG. 3, the operation process improvement item selection unit 163 selects an improvement item of the operation processes in the preparatory work time based on the creation results of the action diagram creation unit 161 and the work content item table creation unit 162. The operation process improvement item selection unit 163 selects, as an improvement item, a work item whose working time is longer than the normal working time, for example. Note that the normal working time is time obtained in consideration of a theoretical value calculated based on the movement speed of an operator and/or the movement speed of a machine movable unit, and collected past measured values. In this case, the past record value is an average value of recorded values of similar work performed with machines installed in the facilities of a plurality of customers, for example.

As illustrated in FIG. 6 with leftward inclined lines, the working time is longer than the normal working time at set portions 11-1 and 11-2 in the sheet feeding unit 11, set portions 31-4, 31-5, 31-6 and 31-7 in the slotter creaser unit 31, set portions 41-1, 41-2 and 41-5 in the die cutting (DC) unit 41, and a set portion 61-2 of the front stop in the counter ejector unit (CE) 61, for example. Therefore, the operation process improvement item selection unit 163 selects, as improvement items, these work items whose working times are longer than the normal working time. For example, in a case that the device at the set portion 11-1, where the normal working time is one minute, in the box making machine 10 is three minutes in this plant, the corresponding work item is selected as an improvement item. In addition, as illustrated in FIG. 6 with rightward inclined lines, set portions 11-11 and 11-16 in the sheet feeding unit 11 and set portions 21-1 and 21-2 in the printing unit 21 can be considered to be items which can be simultaneously performed with other work and/or can be moved forward, for example. The operation process improvement item selection unit 163 selects such items as improvement items. Note that the number or ratio of items to be selected by the operation process improvement item selection unit 163 as improvement items may be set in advance.

While the operation process improvement item selection unit 163 selects a work item whose working time is longer than the normal working time as an improvement item in the above description, this configuration is not limitative. Examples of the selection criteria of the operation process improvement item selection unit 163 include criteria described below, and the criteria may be combined.

1. Items included in a predetermined (arbitrary) upper percentage based on Pareto analysis 2. Items whose completion is the start condition of another operation process For example, in FIG. 6, set portion 11-6 can be started upon completion of set portions 11-1 and 11-2.

Upon completion of set portions 31-4 to 31-7, a set portion 31-10 can be started.

Upon completion of the set portions 61-2, a set portion 61-5 can be started.

3. Items in which the operator's movement length is long in the action diagram

For example, in FIG. 4, the process number "13": movement of the operator B from inspection to the auto feeder, the process number "20": movement of the operator B from the auto feeder to the counter ejector unit (CE) 61, and the process number "25": movement of the operator A from the supply conveyor or the like to the 4C printing unit 21D.

4. Items whose operator working time is greater than a predetermined (arbitrary) percentage with reference to the normal time for that work in the action diagram For example, items longer than two minutes in a case that a percentage of 200 is set to be exceeded with respect to the normal working time for a certain work, and that the normal working time is one minute.

As illustrated in FIG. 3, the operation process improvement plan creation unit 164 creates an improvement plan of the operation process for the improvement item selected by the operation process improvement item selection unit 163. The operation process improvement plan creation unit 164 can propose an improvement plan of the operation process to the customer by transmitting an improvement plan of the operation process to the control device 101 of the box making machine 10 and/or a customer computer via the communication devices 141, 142 and 143 and the communication network 144, and by displaying the plan on the display device 114.

Figure 7:
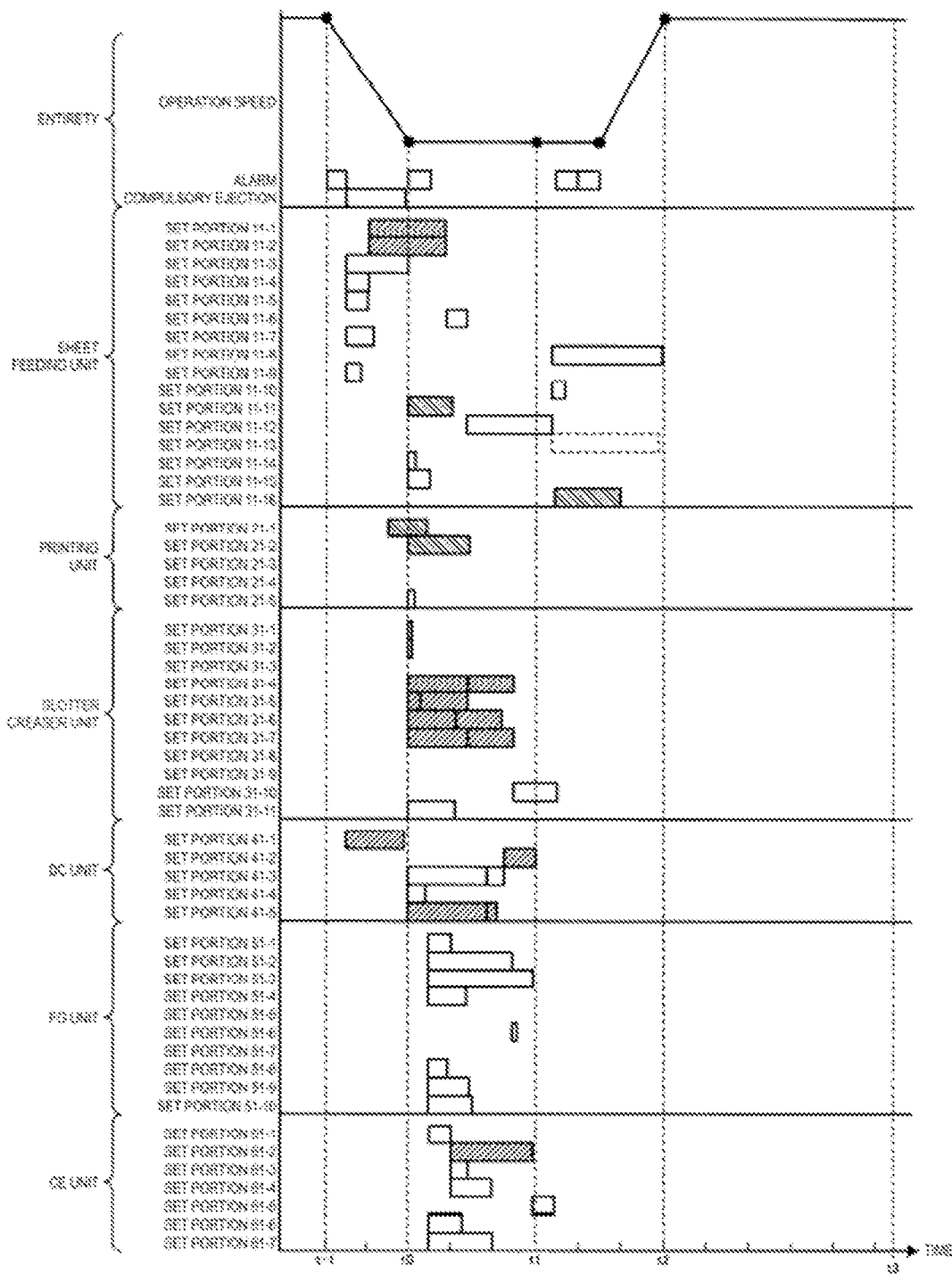
FIG. 7 is a device working time graph in a preparatory period of an improved box making machine.

FIG. 7 is a device working time graph in a preparatory period of an improved box making machine.

As illustrated in FIG. 6, the operation process improvement item selection unit 163 selects various types of work in the sheet feeding unit 11, the slotter creaser unit 31, the die cutting (DC) unit 41, and the counter ejector unit (CE) 61, and the operation process improvement plan creation unit 164 analyzes whether the selected items can be improved. Examples of the method of improvement include introducing a new device, increasing the number of operators, and reassignment of work of operators. In the present embodiment, the operation process improvement plan creation unit 164 determines that the selection items selected by the operation process improvement item selection unit 163 can be improved. As illustrated in FIG. 7, the operation process improvement plan creation unit 164 can shorten the working time in the sheet feeding unit 11, the slotter creaser unit 31, the die cutting (DC) unit 41 and the counter ejector unit (CE) 61 by introducing a new device. In FIG. 7, the items indicated with leftward inclined lines and rightward inclined lines are the work items whose working times are shortened.

As illustrated in FIG. 3, the preparatory work time analysis unit 151 successfully created an operation process improvement plan which can shorten the preparatory work time as a result of analysis of the preparatory work time in the box making machine 10. As illustrated in FIG. 1, the analysis device 132 proposes an operation process improvement plan by transmitting a created operation process improvement plan to a customer computer and/or the control device 101 of the box making machine 10 via the communication devices 141, 142 and 143 and the communication network 144.

The analysis device for a preparatory work time in the paper converting machine according to the embodiment includes: the operator position detection device 113 configured to detect a working position of an operator in the preparatory work time of box making machine 10; the action diagram creation unit 161 configured to create an action diagram of the operator on a basis of a detection result of the operator position detection device 113; a work content item table creation unit 162 configured to create a work content item table indicating the work content in the preparatory work time in a unit of an item on a basis of operation processing data and operation data of box making machine 10; and the operation process improvement item selection unit 163 configured to select an improvement item of an operation process in the preparatory work time on a basis of a creation result of the action diagram creation unit 161 and the work content item table creation unit 162.

Accordingly, an action diagram of the operator is created based on the working position of the operator in the preparatory work time, a work content item table indicating a work content in the preparatory work time for each item is created based on operation processing data and paper converting machine operation data, and an improvement item of the operation processes in the preparatory work time is selected based on the action diagram and the work content item table. As a result, an improvement point of work can be determined by analyzing the work content of the preparatory work which is performed before the start of the manufacturing work, and production efficiency can be improved by proposing details for improvement.

In the analysis device for the preparatory work time in the paper converting machine according to the embodiment, the action diagram creation unit 161 creates an action diagram of the operator which indicates changes in a working position and a working time of the operator with respect to a component device of the box making machine 10. Accordingly, with the action diagram of the operator indicating the changes in the working position and the working time of the operator with respect to the component device of the box making machine 10, work having a room for improvement and wasteful work of the operator can be determined, and proposal for improvement can be readily created.

In the analysis device for the preparatory work time in the paper converting machine according to the embodiment, the work content item table creation unit 162 includes the itemized working time graph creation unit 165 configured to create an itemized working time graph indicating a working time in a unit of an item, the itemized working time graph indicating an operation content of the box making machine 10 and a work content of the operator in such a manner that the operation content of the box making machine 10 and the work content of the operator are separated from each other. Accordingly, with the itemized working time graph indicating the working time for each item in which the operation content of the box making machine 10 and the work content of the operator are separated from each other, items having a room for improvement can be readily determined in the operation content of the box making machine 10 and the work content of the operator.

In the analysis device for the preparatory work time in the paper converting machine according to the embodiment, the work content item table creation unit 162 includes the device working time graph creation unit 166 configured to create a device working time graph indicating an operation content and a working time for each component device of the box making machine 10. Accordingly, with the device working time graph indicating an operation content and a working time of each component device of the box making machine 10, improvement points in each component device of the box making machine 10 can be readily recognized.

In the analysis device for the preparatory work time in the paper converting machine according to the embodiment, the operation process improvement item selection unit 163 selects, as the improvement item, a work item whose working time is longer than a normal working time. For example, in a case that the normal working time at the set portion 11-1 in the box making machine 10 in the other plant is one minute, and the working time of the box making machine 10 in this plant for that is three minutes, it is estimated that the working procedure and the working action line of the operator and the like have a room for improvement. Accordingly, by selecting a work item whose working time is longest as an improvement item, the working time in the selected improvement items can be shortened and work efficiency can be improved.

In the analysis device for the preparatory work time in the paper converting machine according to the embodiment, the operation process improvement item selection unit 163 selects, as the improvement item, a work item whose completion is a condition for a start of another work item. Accordingly, by selecting, as an improvement item, a work item whose completion is a condition for a start of another work item, the working time in the selected improvement items can be shortened, and the work of other work item can be started upon completion of the work of the selected improvement items, and as a result, the entire preparatory period is quickly completed, thus improving work efficiency.

In the analysis device for the preparatory work time in the paper converting machine according to the embodiment, the operation process improvement item selection unit 163 selects, as the improvement item, a work item in which a movement length of the operator is long. Accordingly, by selecting, as the improvement item, a work item in which a movement length of the operator is long, work efficiency can be improved with minimum cost by taking measures such as reconsideration of the working action lines and the working procedure of the operator.

In the analysis device for the preparatory work time in the paper converting machine according to the embodiment, the operation process improvement item selection unit 163 sets in advance a number or a ratio of items to be selected as the improvement item. Accordingly, by setting in advance a number or a ratio of items to be selected as the improvement item, the number and the range of improvement items to be selected can be arbitrarily provided, and thus the improvement items can be more efficiently selected.

The analysis device for the preparatory work time in the paper converting machine according to the embodiment further includes the operation process improvement plan creation unit 164 configured to create an improvement plan of an operation process for the improvement item selected by the operation process improvement item selection unit 163. Accordingly, by creating an improvement plan of the operation process for selected improvement items, the created improvement plan of the operation process can be provided to the facility where the box making machine 10 is supplied.

The analysis device for the preparatory work time in the paper converting machine according to the embodiment further includes the communication devices 141, 142 and 143 capable of transmitting and/or receiving data with the control device 101 of the box making machine 10 and/or the customer computer 121, in which, by the communication devices 141 and 142, operation data of the box making machine 10 is received from the control device 101, and an operation process improvement plan of the box making machine 10 is transmitted to at least one of the control device 101 and the customer computer 121. Accordingly, by collecting the operation data of the box making machine 10 via communication network 144 to create an operation process improvement plan, and by transmitting the created operation process improvement plan by the communication devices 141 and 142, the operation process improvement plan created by the manufacturer of the box making machine 10 can be readily provided to the facility where the box making machine 10 is supplied.

In the analysis device for the preparatory work time in the paper converting machine according to the embodiment, by the communication devices 141 and 142, stop factor data of the box making machine 10 is received from the control device 101, and a stop factor analysis result of the box making machine 10 is transmitted to the control device 101 and/or the customer computer 121. Accordingly, an improvement plan can be created by analyzing the stop factor based on the stop factor data, and a stop factor analysis result and/or an improvement plan can be readily proposed to the facility where the box making machine 10 is supplied.

In the analysis device for the preparatory work time in the paper converting machine according to the embodiment, by the communication devices 141 and 142, position adjustment data of the box making machine 10 is received from the control device 101, and a determination result of the position adjustment data of the box making machine 10 is transmitted to the control device 101 and/or the customer computer 121. Accordingly, with the server 131 storing an optimum value of position adjustment data of the box making machine 10, a determination result of the position adjustment data of the box making machine 10 which is being adjusted can be readily determined based on the position adjustment data, and advice can be given to the facility where the box making machine 10 is supplied.

In the analysis device for the preparatory work time in the paper converting machine according to the present invention, by the communication devices 141 and 142, the operation data of the box making machine 10 is received from the control device 101, and a component failure analysis result of the box making machine 10 is transmitted to the control device 101 and/or the customer computer 121. Accordingly, by performing the component failure analysis of the box making machine 10 based on the operation data of the box making machine 10, replacement work of the failure component can be proposed and implemented at a suitable timing.

In the analysis device for the preparatory work time in the paper converting machine according to the embodiment, by the communication devices 141 and 142, the operation data of the box making machine 10 is received from the control device 101, and a component remaining service life analysis result of the box making machine 10 is transmitted to the control device 101 and/or the customer computer 121. Accordingly, by analyzing the component remaining service time of the box making machine 10 based on the operation data of the box making machine 10, replacement work of the expendable component can be proposed and implemented in an early stage.

The communication devices 141, 142 and 143 transmits the component remaining service life analysis result of the box making machine 10 before a period calculated by adding a number of days until a component is supplied to a scheduled component replacement date which is a timing obtained in consideration of the component replacement timing and the component supply timing. Accordingly, the inventories in the customers' facility can be reduced, and the components can be replaced at a suitable timing.

In the analysis device for the preparatory work time in the paper converting machine according to the embodiment, by the communication devices 141 and 142, the operation data of the box making machine 10 is received from the control device 101, and a diagnostic analysis result of the box making machine 10 is transmitted to the control device 101 and/or the customer computer 121. Accordingly, by performing the diagnosis analyze of the box making machine 10 based on the operation data of the box making machine 10, whether the operation state of the running box making machine 10 is normal can be determined, and the operation state of the box making machine 10 can be notified before abnormality occurs.

In the analysis device for the preparatory work time in the paper converting machine according to the embodiment, the operation process improvement plan, the stop factor analysis result, a determination result of the position adjustment data, the component failure analysis result, the component remaining service life analysis result, the diagnostic analysis result of the box making machine 10 are transmitted to the control device 101, and to the customer computer. The operation process improvement plan, the stop factor improvement plan, proposal for arrangements and replacement of the expendable component and the like require the customer's organized determination (judgment by the management division), and therefore are transmitted to the customer computer, and thus the customers can judge at an appropriate timing. In addition, by transmitting an alarm for improper adjustment of the machine, advice of a coping method for failure of the machine and the like to the machine control device, the worker at the corresponding facility can respond in a timely manner, and, by transmitting the above-mentioned information also to the customers' management division, the customers' management division can recognize the status of the machine.

The analysis method of analyzing a preparatory work time in the paper converting machine according to the embodiment includes creating an action diagram of an operator on a basis of a working position of the operator in the preparatory work time of the box making machine 10; creating a work content item table indicating the work content in the preparatory work time in a unit of an item on a basis of operation processing data and paper converting machine operation data; and selecting an improvement item of an operation process in the preparatory work time on a basis of the action diagram and the work content item table. Accordingly, an improvement point of work can be determined by analyzing the work content of the preparatory work which is performed before the start of the manufacturing work, and production efficiency can be improved by proposing details for improvement.

While the analysis device for a preparatory work time in the paper converting machine according to the present invention is applied to the box making machine 10 in the above-described embodiment, the analysis device may be applied to a corrugating machine as a manufacturing device for a corrugated cardboard sheet. Although not illustrated in the drawings, in a corrugating machine as a manufacturing device for a corrugated cardboard sheet, a rear liner (second liner) is bonded to a core sheet processed in a wavy form to manufacture a one-sided corrugated cardboard sheet, and a front liner (first liner) is bonded to the core paper of the manufactured one-sided corrugated cardboard sheet to manufacture a continuous double-sided corrugated cardboard sheet. Then, the continuous double-sided corrugated cardboard sheet is cut into predetermined lengths to manufacture plate-shaped double-sided corrugated cardboard sheets.

Specifically, the corrugating machine includes a plurality of mill roll stands, a single facer, a bridge, a preheater, a glue machine, a double facer, a rotary shear, a slitter scorer, a cut-off device, a defective ejector, and a stacking unit.

Also in a case that a corrugating machine is applied as a paper converting machine instead of the box making machine 10, the functions of the network and the analysis device are almost not changed. In manufacture of corrugated cardboard sheets with the corrugating machine, it is necessary to perform preparatory work such as change work of a corrugated roll unit for processing the core paper into a wavy form, and supply work of the liners and/or the core paper in accordance with the change of the type of the corrugated cardboard sheet in between the processes for manufacturing the corrugated cardboard sheets. The analysis device and the analysis method for a preparatory work time in the paper converting machine according to the present invention are intended for analyzing the above-mentioned preparatory work time.

The invention claimed is:

1. An analysis device for a preparatory work time in a paper converting machine, the preparatory work being performed before start of actual production operation of the paper converting machine, the analysis device being configured to analyze a work content in the preparatory work time, the analysis device comprising:
 a working position detection device configured to detect a working position of an operator in the preparatory work time;
 an action diagram creation unit configured to create an action diagram of the operator on a basis of a detection result of the working position detection device;
 a work content item table creation unit configured to create a work content item table indicating the work content in the preparatory work time in a unit of an item on a basis of operation processing data and paper converting machine operation data; and
 an operation process improvement item selection unit configured to select an improvement item of an operation process in the preparatory work time on a basis of a creation result of the action diagram creation unit and the work content item table creation unit.

2. The analysis device for the preparatory work time in the paper converting machine according to claim 1, wherein the action diagram creation unit creates the action diagram of the operator which indicates changes in the working position and a working time of the operator with respect to component devices of the paper converting machine.

3. The analysis device for the preparatory work time in the paper converting machine according to claim 2, wherein the work content item table creation unit includes an itemized working time graph creation unit configured to create an itemized working time graph indicating a working time in a unit of an item, the itemized working time graph indicating an operation content of the paper converting machine and a work content of the operator in such a manner that the operation content of the paper converting machine and the work content of the operator are separated from each other.

4. The analysis device for the preparatory work time in the paper converting machine according to claim 3, wherein the work content item table creation unit includes a device working time graph creation unit configured to create a device working time graph indicating an operation content and a working time for each component device of the paper converting machine.

5. The analysis device for the preparatory work time in the paper converting machine according to claim 4, further comprising an operation process improvement plan creation unit configured to create an improvement plan of an operation process for the improvement item selected by the operation process improvement item selection unit.

6. The analysis device for the preparatory work time in the paper converting machine according to claim 1, wherein the work content item table creation unit includes an itemized working time graph creation unit configured to create an itemized working time graph indicating a working time in a unit of an item, the itemized working time graph indicating an operation content of the paper converting machine and the work content of the operator in such a manner that the operation content of the paper converting machine and the work content of the operator are separated from each other.

7. The analysis device for the preparatory work time in the paper converting machine according to claim 1, wherein the work content item table creation unit includes a device working time graph creation unit configured to create a device working time graph indicating an operation content and a working time for each component device of a plurality of component devices of the paper converting machine.

8. The analysis device for the preparatory work time in the paper converting machine according to claim 1, wherein the operation process improvement item selection unit selects, as the improvement item, a work item whose working time is longer than a normal working time.

9. The analysis device for the preparatory work time in the paper converting machine according to claim 1, wherein the operation process improvement item selection unit selects, as the improvement item, a work item whose completion is a condition for a start of another work item.

10. The analysis device for the preparatory work time in the paper converting machine according to claim 1, wherein the operation process improvement item selection unit selects, as the improvement item, a work item in which the operator moves a long distance, wherein the long distance is between a supply conveyor and a printing unit, between an inspection place and an auto feeder, and/or between the auto feeder and a counter ejector unit.

11. The analysis device for the preparatory work time in the paper converting machine according to claim 1, wherein the operation process improvement item selection unit sets in advance a number or a ratio of items to be selected as the improvement item.

12. The analysis device for the preparatory work time in the paper converting machine according to claim 1, further comprising an operation process improvement plan creation unit configured to create an improvement plan of the operation process for the improvement item selected by the operation process improvement item selection unit.

13. The analysis device for the preparatory work time in the paper converting machine according to claim 12, further comprising a communication device capable of transmitting and/or receiving data with a control device of the paper converting machine, wherein
 by the communication device, operation data of the paper converting machine is received from the control device and the operation process improvement plan of the paper converting machine is transmitted to at least one of the control device and a customer computer.

14. The analysis device for the preparatory work time in the paper converting machine according to claim 13, wherein, by the communication device, stop factor data of the paper converting machine is received from the control device and a stop factor analysis result of the paper converting machine is transmitted to at least one of the control device and the customer computer.

15. The analysis device for the preparatory work time in the paper converting machine according to claim 13, wherein, by the communication device, position adjustment data of the paper converting machine is received from the control device and a determination result of the position adjustment data of the paper converting machine is transmitted to at least one of the control device and the customer computer.

16. The analysis device for the preparatory work time in the paper converting machine according to claim 13, wherein, by the communication device, the operation data of the paper converting machine is received from the control device and a component failure analysis result of the paper converting machine is transmitted to at least one of the control device and the customer computer.

17. The analysis device for the preparatory work time in the paper converting machine according to claim 13, wherein, by the communication device, the operation data of the paper converting machine is received from the control device and a component remaining service life analysis result of the paper converting machine is transmitted to at least one of the control device and the customer computer.

18. The analysis device for the preparatory work time in the paper converting machine according to claim 17, wherein the communication device transmits the component remaining service life analysis result of the paper converting machine before a period calculated by adding a number of days until a component is supplied, to a scheduled component replacement date.

19. The analysis device for the preparatory work time in the paper converting machine according to claim 13, wherein, by the communication device, the operation data of the paper converting machine is received from the control device and a diagnostic analysis result of the paper converting machine is transmitted to at least one of the control device and the customer computer.

20. An analysis method of analyzing a work content in a preparatory work time in a paper converting machine, the preparatory work being performed before start of actual production operation of the paper converting machine, the method comprising:
  creating an action diagram of an operator on a basis of a working position of the operator in the preparatory work time;
  creating a work content item table indicating the work content in the preparatory work time in a unit of an item on a basis of operation processing data and paper converting machine operation data; and
  selecting an improvement item of an operation process in the preparatory work time on a basis of the action diagram and the work content item table.

\* \* \* \* \*